United States Patent
Brown et al.

(10) Patent No.: US 6,237,943 B1
(45) Date of Patent: May 29, 2001

(54) VEHICLE ROLLOVER CURTAIN WITH IMPROVED DEPLOYMENT

(75) Inventors: Joseph Robert Brown, Grosse Ile; Julie Ann Zychowicz, Dearborn Heights; Karen M. Balavich, Lake Orion, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/684,077

(22) Filed: Oct. 7, 2000

(51) Int. Cl.[7] .................................................. B60R 21/22
(52) U.S. Cl. ..................................... 280/730.2; 280/730.1; 280/728.2; 280/743.2; 280/749
(58) Field of Search ............................. 280/728.1, 728.2, 280/730.1, 730.2, 743.1, 743.2, 749

(56) References Cited

U.S. PATENT DOCUMENTS

| | | |
|---|---|---|
| 5,540,459 | 7/1996 | Daniel . |
| 5,730,463 | 3/1998 | Fisher et al. . |
| 5,788,270 | 8/1998 | Haland et al. . |
| 5,924,723 | 7/1999 | Brantman et al. . |
| 5,957,487 * | 9/1999 | Stutz ................................ 280/730.2 |
| 6,000,715 | 12/1999 | Tschaeschke . |
| 6,010,149 | 1/2000 | Riedel et al. . |
| 6,095,551 * | 8/2000 | O'Docherty ....................... 280/730.2 |
| 6,135,490 * | 10/2000 | Spary ................................ 280/730.2 |
| 6,149,195 * | 11/2000 | Faigle ................................ 280/749 |

* cited by examiner

Primary Examiner—Paul N. Dickson
Assistant Examiner—Faye M. Fleming
(74) Attorney, Agent, or Firm—Gary A. Smith

(57) ABSTRACT

A vehicle occupant restraint system includes a restraint curtain stowed adjacent a roof rail of the vehicle to deploy downwardly adjacent the side wall of the vehicle. The curtain is formed with a slit extending from a lower edge upwardly toward an upper edge to divide the curtain into first and second sections. A short, rod-like connecting member is attached to the curtain adjacent the lower edge and spans the slit, tying the first and second sections together. A ring encircles the connecting member and a flexible tether is attached to the ring. The end of the tether opposite the ring is slidingly engaged with a guide track disposed on a pillar extending downwardly from the vehicle roof. The curtain is placed in the stowed condition by rolling it in a spiral fashion, starting at the lower edge and rolling toward the upper edge in a direction parallel to the slit so that the connecting members remain accessible through the slit even in the stowed condition. The connecting member is free to rotate within the ring so that the curtain may roll and unroll freely without the tether becoming wound up in or otherwise entangled with the curtain. When the curtain is in the stowed condition, the tether is slid to the upper end of the guide track. As the curtain unrolls to the deployed condition the tether travels downwardly along the guide track, holding the lower edge of the curtain close to the pillar.

20 Claims, 3 Drawing Sheets

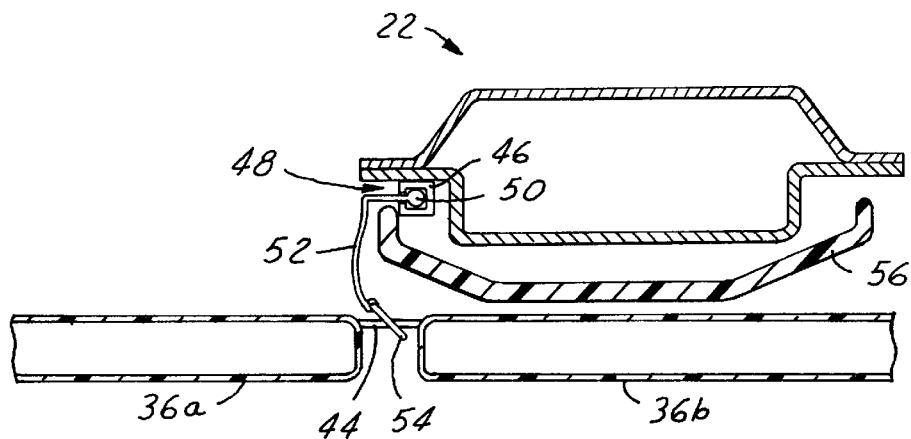
FIG.6
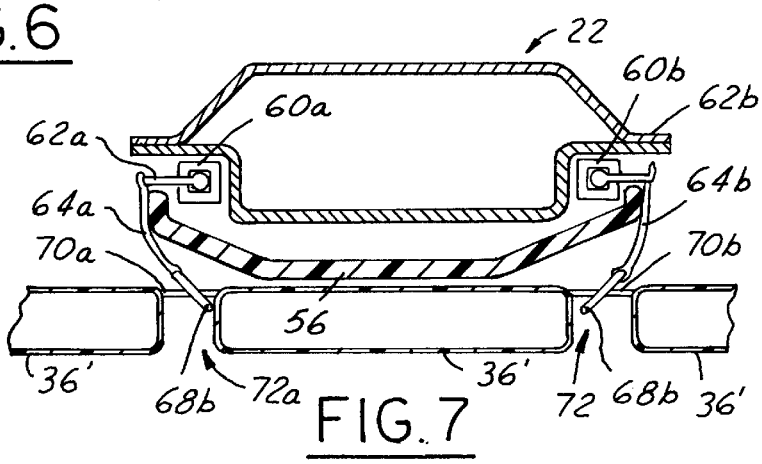
FIG.7
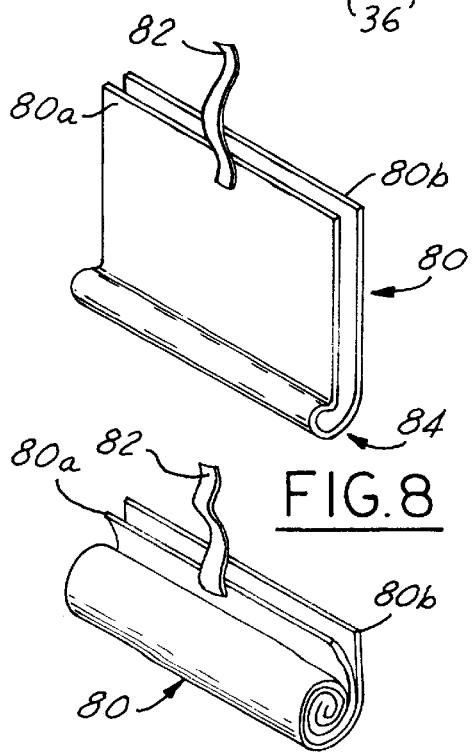
FIG.8
FIG.9
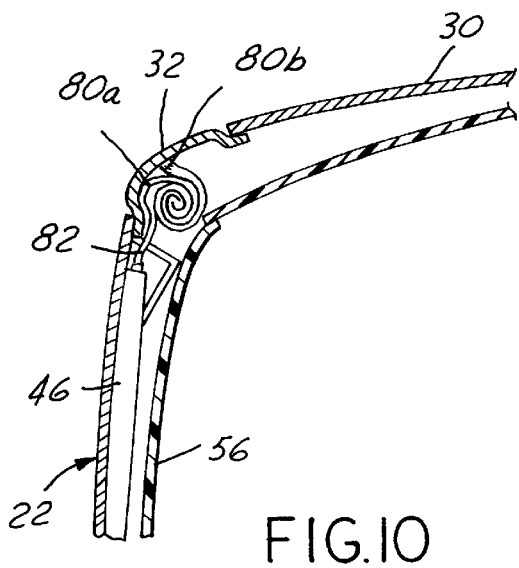
FIG.10

VEHICLE ROLLOVER CURTAIN WITH
IMPROVED DEPLOYMENT

FIELD OF THE INVENTION

This invention relates generally to occupant restraints for automotive vehicles, and more particularly to curtain-type restraints deployed adjacent the side windows of the vehicles to protect occupants during rollover and/or side impact events.

BACKGROUND OF THE INVENTION

It is known to use deployable side curtains in automotive vehicles to protect vehicle occupants during side impact and/or rollover events. Such side curtains, also commonly known as rollover curtains, may take the form of a flexible curtain (usually made of a mesh material) covering the side windows to protect against the occupants being ejected through the doors or windows, or an inflatable airbag which protects against ejection and also provides a degree of cushioning.

Prior to deployment, a side curtain is typically folded or rolled into a compact, elongated shape that is secured to the vehicle adjacent the roof rail above a window opening or door opening. Interior trim panels cover the stowed curtain to hide it from view. In the deployed condition, the side curtain extends downwardly from the roof rail to at least partially cover the window/door openings and/or the pillars adjacent the openings. One or more curtains may be disposed along the length of the passenger compartment as necessary to provide protection to occupants in any or all of the rows of seats in the passenger compartment. U.S. Pat. No. 6,000,715 teaches a non-inflatable side curtain. U.S. Pat. No. 5,540,459 teaches inflatable an inflatable side curtain. U.S. Pat. No. 5,788,270 teaches a side curtain comprising both inflatable and non-inflatable sections.

During a vehicle rollover or other type of side impact event, the side curtain should move from its stowed condition to its deployed condition rapidly and the lower edge of the curtain should be held close to the side of the vehicle during deployment in order to ensure that the curtain passes between the occupant and the side wall of the vehicle before any part of the occupant's body moves outboard of the curtain. It is known to attempt to keep the curtain close to the vehicle side wall by means of tethers, cords, or similar members connecting the forward and/or the rear lower corners of the curtain to the vehicle structure when in the deployed condition.

For some curtain configurations, however, it may be desirable to connect the curtain to the vehicle structure at some point on the lower edge of curtain lying between the forward and rear corners. For example, when a restraint curtain extends along two or more rows of occupant seating, connecting the midpoint of the curtain to the adjacent B-pillar or other structure may improve the deployment dynamics and post-deployment stability of the curtain.

U.S. Pat. No. 5,788,270 teaches a curtain having a tab at the midpoint of its lower edge, the tab engaging a channel extending generally vertically along the B-pillar of the vehicle. The tab is urged downward along the channel as the curtain deploys, with the engagement between the tab and the channel holding the lower edge of the curtain closely adjacent the B-pillar throughout its deployment. This configuration requires that the curtain be folded such that, when in the stowed condition, its lower edge is exposed on the outside of the folded curtain and immediately adjacent to the channel so that the tab may be connected with the channel.

To ensure proper deployment, however, a curtain is often folded or rolled inwardly on itself so that the lower edge is buried in the interior of the stowed curtain. For example, in some circumstances optimum curtain deployment is achieved by placing the curtain in the stowed condition using a "roll fold" in which the curtain, starting at the lower edge, is rolled upwardly in a spiral fashion toward the upper edge. When a curtain is folded in this manner, the lower edge of the curtain cannot be connected directly to the vehicle structure as taught by the '270 patent. While it is possible to attach a tether to the curtain at a midpoint of the lower edge and simply roll the tether up into the curtain, this requires the tether to be longer than the vertical dimension of the curtain. A tether this long would have to tightened by some mechanical actuator during deployment of the curtain, with resulting increases in the complexity, cost, and deployment time of the restraint system.

SUMMARY OF THE INVENTION

It is an object of the present invention to provide a vehicle occupant restraint system wherein a restraint curtain is stowed adjacent a roof rail of the vehicle and deploys downwardly adjacent the side wall of the vehicle in a manner to provide superior stability and positioning of the curtain during and after deployment. In general, this is achieved by ensuring that a midpoint of the lower edge of the curtain is retained close to the side wall of the vehicle throughout deployment of the curtain.

In general, this is achieved by providing a tether attaching a midpoint of the lower edge of the curtain to the vehicle structure and ensuring that the tether is kept as short as possible.

According to a first embodiment of the invention disclosed herein, the curtain is formed with a slit extending from a lower edge of the curtain upwardly toward the upper edge to divide the curtain into first and second sections. A short, rod-like connecting member is attached to the curtain adjacent the lower edge and spans the slit, tying the first and second sections together. A ring encircles the connecting member and a flexible tether is attached to the ring. The end of the tether opposite the ring is slidingly engaged with a guide track disposed on a pillar extending downwardly from the vehicle roof.

The curtain is placed in the stowed condition by rolling it in a spiral fashion, starting at the lower edge and rolling toward the upper edge. The direction of the roll is parallel to the slit so that the connecting members remain accessible through the slit even in the stowed condition. The connecting member is free to rotate within the ring so that the curtain may roll and unroll freely without the tether becoming wound up in or otherwise entangled with the curtain. When the curtain is in the stowed condition, the tether is slid to the upper end of the guide track.

As the curtain unrolls to the deployed condition the tether travels downwardly along the guide track, holding the lower edge of the curtain close to the pillar. The slit, connecting member, and ring combine to allow the tether to be kept to a minimum length so that it effectively restrains the lower edge of the curtain 36 and stabilizes the curtain in the desired position covering the window and/or door openings of the passenger compartment, providing protection against ejection and preventing the curtain from being pushed out of the side opening during a crash or rollover event.

In a second embodiment of the invention, a method of folding the curtain is disclosed which eliminates the need for the slit, connecting member and ring. In this embodiment, a tether is sewn or otherwise fixed to the lower edge of the curtain. In the first step of the method, the lower edge of the curtain is brought up to meet the upper edge, folding the curtain generally in half. This forms a crease at the new lower end of the curtain and places the tether adjacent the curtain's upper edge. The curtain is then rolled upwardly in a spiral fashion, starting at the crease edge. This results in the curtain being in a quick-deploying "roll fold" configuration while leaves the tether exposed on the outside of curtain when in the stowed condition so that the tether may be attached to a guide rail similar to that disclosed in the first embodiment of the invention. As in the first embodiment, the tether is kept quite short so that it holds the lower edge of the curtain close to the side wall of the vehicle during and after deployment, without the need for any tightening mechanism.

According to another feature of the invention, the restraint system includes two guide tracks extending generally vertically along the pillar at spaced locations. First and second tethers are connected to the curtain at separate, spaced apart locations and each tether is slidingly engaged with one of the guide tracks. The use of two guide tracks and two points of attachment to the curtain provides a more positive and secure positioning of the restraint curtain during deployment and when in the fully deployed condition.

BRIEF DESCRIPTION OF THE DRAWINGS

The foregoing and other advantages of the present invention may occur to those skilled in the vehicle occupant restraint arts upon reading the following description with reference to the accompanying drawings, in which:

FIG. 6 is a cross-sectional view taken along lines 6—6 of FIG. 1 with the curtain in the deployed condition;

FIG. 7 is a cross-sectional view similar to that of FIG. 6 showing another embodiment of the invention in which two guide tracks restrain the curtain;

FIGS. 8 and 9 are a perspective views showing steps in a second method of folding a curtain; and FIG. 10 is a cross-sectional view showing the curtain of FIGS. 8 and 9 in the stowed condition.

DETAILED DESCRIPTION OF THE PREFERRED EMBODIMENT

Figure 1:
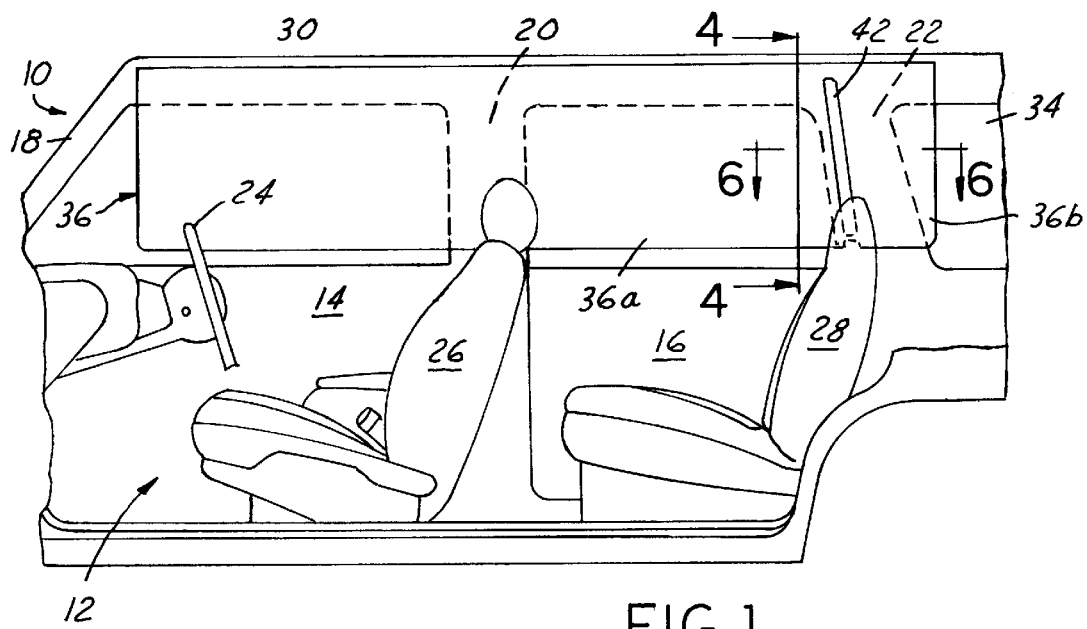
FIG. 1 is an interior view of an automotive vehicle showing the restraint curtain of the present invention in a deployed condition.

As seen in FIG. 1, an automotive vehicle 10 is illustrated as including a body having a side wall 12. A front door 14 and a rear door 16, each having respective windows, act as closure panels with respect to the side wall 12. An A-pillar 18 bounds the forward end of the front door 14 and a B-pillar 20 bounds the rearward end. The rearward end of the rear door 16 is bounded by a C-pillar 22. The passenger compartment of the vehicle is indicated generally and has a steering wheel 24 and front and rear seats 26, 28. The passenger compartment is vertically bounded on its top by a roof 30, and a roof rail 32 is fixed securely to the roof and extends generally horizontally above the doors 14, 16, as is well known in vehicle body construction. A rear side window 34 is located rearward of the C-pillar 22, such as may be the case in a light truck or a sport utility vehicle. The above-described vehicle configuration does not constitute a limitation on the scope of the invention, as the invention may be utilized in a vehicle with any number or doors, windows, or rows of seating.

The roof rail 32 carries an inflatable restraint curtain 36. FIG. 1 shows the restraint curtain 36 in a fully inflated or deployed condition wherein it extends downwardly from the roof rail 32 to substantially cover the window and/or door openings in the vehicle body adjacent the front and rear seat occupant positions.

Although restraint curtain 36 is described and depicted herein as being an inflatable airbag, it is to be understood that the invention may also be practiced with a non-inflatable curtain of the type well known in the vehicle occupant restraint field.

Figure 2:
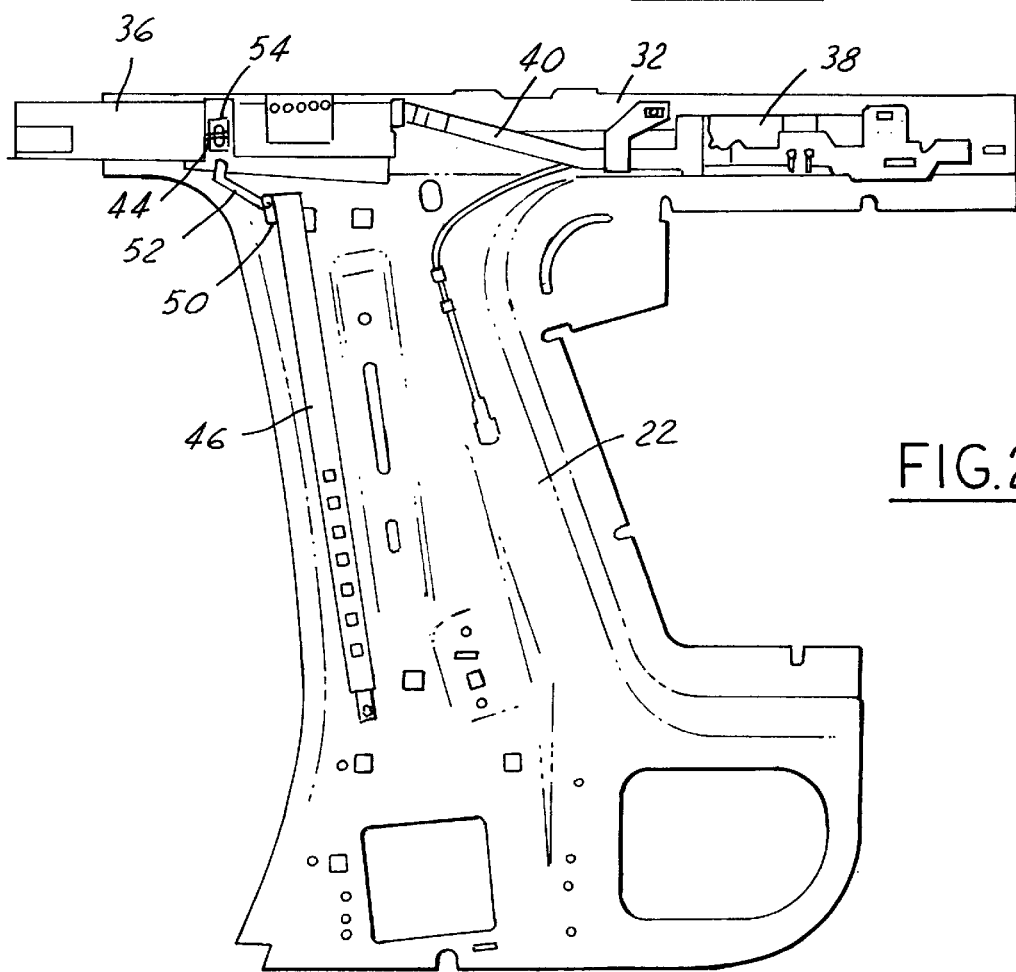
FIG. 2 is a detailed view of the automotive vehicle interior with trim panels removed to show the restraint curtain in a stowed condition.

FIG. 2 depicts the restraint curtain 36 in a deflated and stowed condition wherein it is rolled into a compact spiral configuration and secured in a position extending along the roof rail 32. For inflation purposes, a gas generator 38 is located adjacent the stowed restraint curtain 36 in the roof rail 32 and is connected thereto by a conduit 40. The stowed restraint curtain 36 and the gas generator 38 are both housed within a compartment located behind the headliner trim panel 41 (see FIGS. 4 and 5), so as to be hidden from view.

As best seen in FIG. 1, a slit 42 extends generally vertically upward from the lower edge of the restraint curtain 36 toward the upper edge thereof, dividing the restraint curtain into a first or forward section 36a and a second or rear section 36b. A connecting member 44 (see FIG. 3) is attached to the restraint curtain 36 adjacent its lower edge and spans the slit 42 to connect the first and second sections. The connecting member 44 may be formed of a rigid material such as plastic or metal, or it may be a flexible material.

Figure 3:
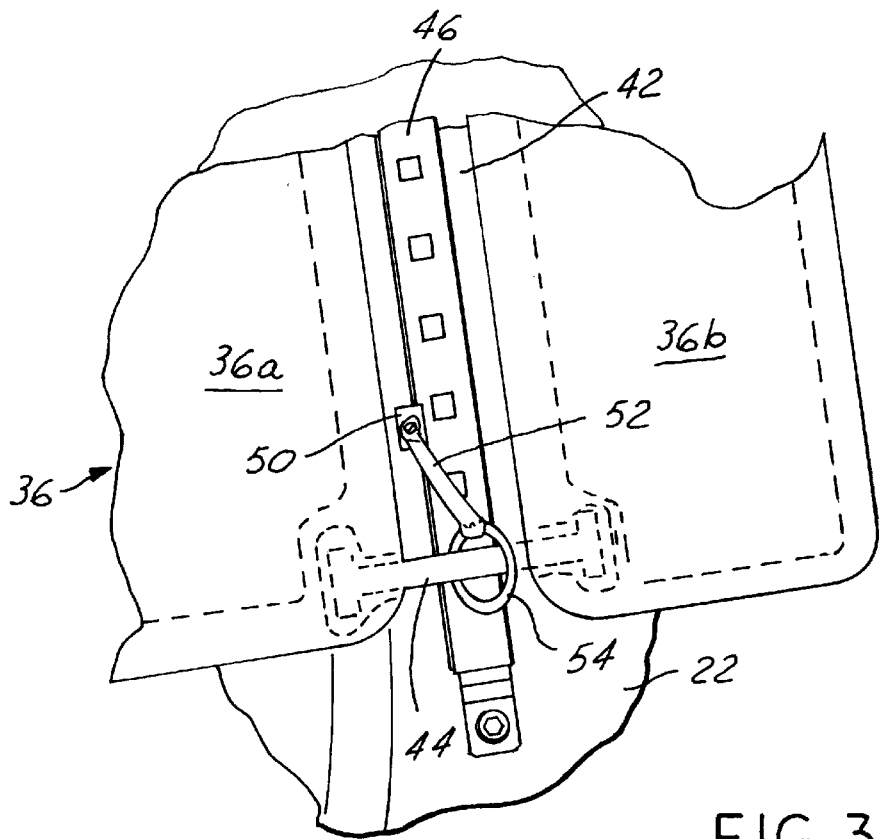
FIG. 3 is a detail view of the lower edge of the curtain in the deployed condition.

A guide track 46 is mounted to the inner surface of the C-pillar 22 and extends generally vertically at a position generally coinciding with the location of the slit 42 when the curtain 36 is in the deployed condition (see FIG. 3). As seen in FIG. 6, the guide track is hidden behind a pillar trim panel 56 and has a slot 48 oriented toward the forward end of the vehicle. A slide member 50 is retained in the slot 48 for vertical sliding movement along the guide rail.

A flexible tether 52 has a first end attached to the slide member 50 and a second end attached to a ring 54. The ring 54 encircles the connecting member 44 as best seen in FIG. 3, so that the connecting member 44 is free to rotate relative to the ring and the tether 52.

When in the stowed condition, the restraint curtain 36 is rolled into a spiral by rolling the lower edge upwardly toward the upper edge of the curtain 36. See FIG. 4. The curtain 36 is rolled in a direction parallel with the slit 42 so that the connecting member 44 is exposed through the slit 42 and the ring 54 may remain attached to the connecting member 44 without the tether 52 becoming rolled up within the curtain 36.

Figure 4:
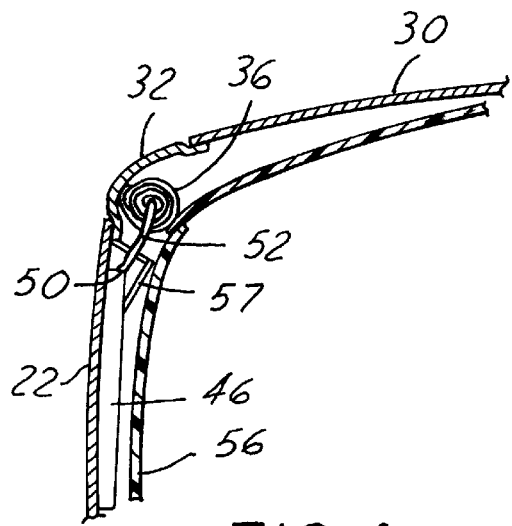
FIG. 4 is a cross-sectional view taken along lines 4—4 of FIG. 1 with the curtain in the stowed condition.
Figure 5:
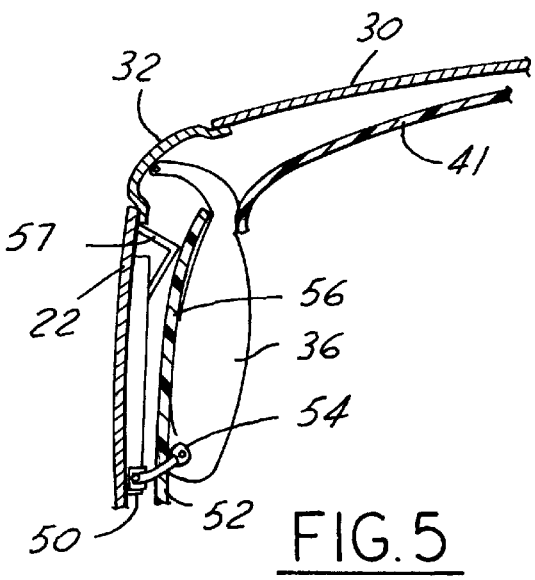
FIG. 5 is a cross-sectional view similar to that of FIG. 4 showing the restraint curtain in the deployed condition.

With the restraint curtain 36 in the stowed condition, the slide member 50 is positioned at the extreme upper end of the guide track 46 and the tether 52 extends to the connecting member 44 as seen in FIGS. 2 and 4. Guide means, such as a ramp 57 (see FIG. 4), may be provided directly below the stowed restraint curtain 36 to direct the restraint curtain 36 in the proper direction as it unrolls to the deployed condition. The headliner trim panel 41 and the pillar trim panel 56 are preferably formed of a flexible, resilient material such as plastic, and are secured to the roof 30 and pillar 22 respectively in a known manner, not shown. The lower end of the headliner trim panel 41 overlaps the upper end of the pillar trim panel 56 by a small amount as seen in FIG. 4 to present a clean, finished appearance within the passenger compartment. As best seen in FIG. 6, the pillar trim panel 56 extends over the guide track 46 to conceal it from view by occupants of the passenger compartment. The slide member 50 and/or the tether 52 project out from behind the pillar trim panel 56 to allow connection of the ring 54 to the connecting member 44.

When the restraint system is triggered during a rollover or side impact event, the restraint curtain 36 is inflated and begins to unroll to its deployed condition. The expanding curtain 36 forces the headliner trim panel 41 past the upper end of the pillar trim panel 56, thus opening a seam through which the restraint curtain 36 may deploy downwardly and over the surface of the pillar trim panel. See FIG. 5.

As the restraint curtain 36 is inflated and unrolls to its deployed condition, the connecting member 44 moves downwardly and is held close to the pillar trim panel 56 by the tether 52. Downward movement of the connecting member 44 urges the tether 52 and slide member 50 downwardly along the guide track 46 until the restraint curtain 36 is fully deployed and the slide member 50 is adjacent the lower end of the guide track 46. During deployment of the curtain 36, the connecting member 44 rotates freely within the ring 54 and so does not interfere in any way with unrolling of the curtain 36.

Although FIGS. 1–6 depict the restraint curtain 36 tethered to the C-pillar 22 of a vehicle, the present invention may just as readily be practiced by tethering the curtain 36 to the A-pillar 18, the B-pillar 20, or any other structure forming or adjacent to the side wall 12 of the vehicle as may be required depending upon the interior configuration of the vehicle and the desired nature of the occupant restraint system.

FIG. 7 depicts an alternative embodiment of an occupant restraint system wherein a curtain 36' has first and second slits 72a, 72b. First and second guide tracks 60a, 60b extend vertically along the pillar 22 at spaced locations. Slide members 62a, 62b engage respective guide tracks 60a, 60b and first and second tethers 64a, 64b extend between the curtain 36' and the respective slide members. In the embodiment of the invention shown in FIG. 7, the two guide tracks 60a, 60b are disposed adjacent opposite edges of the pillar 22 and are covered by a pillar trim panel 56. Each tether 64a, 64b is attached to the restraint curtain 36' by means of a ring 68a, 68b surrounding a connecting member 70a, 70b spanning slits 72a, 72b in the curtain, in a manner generally similar to that described in connection with FIGS. 1–5 above. Alternatively, the tethers 64a, 64b may be attached to the lower edge of the restraint curtain 36' in a more conventional fashion, thus eliminating the connecting members 70a, 70b and the rings 68a, 68b. The use of two guide tracks engaging the restraint curtain at two spaced-apart points provides a more positive and secure positioning of the restraint curtain during deployment and when in the fully deployed condition.

FIGS. 8–10 illustrate a method of rolling a restraint curtain 80 so that a tether 82 attached directly to the lower edge 80a remains exposed on the outside of the roll when in the stowed condition. In the first step of the rolling process, the lower edge 80a of the curtain 80 is brought up to the upper edge 80b, folding the curtain generally in half to form a crease 84 at the new lower end of the curtain and place the tether 82 adjacent the upper edge 80b. The curtain 80 is then rolled in a spiral fashion, starting at the crease edge 84 and rolling upwardly toward the upper and lower edges 80b, 80a. Additional tethers, cords, or similar members (not shown) may also be attached to the curtain 80 adjacent its forward and/or the rear lower corners as desired.

The rolled curtain 80 is mounted adjacent the roof rail 32 with the curtain rolled inwardly, toward the pillar 22 and the tether 82 to the outboard side of the passenger compartment. The upper edge 80b is secured to the vehicle and the tether 82 is attached to a guide track 46, or to some other appropriate tether-tensioning device (not shown).

This results in the curtain 80 being in a quick-deploying "roll fold" configuration with the tether 82 exposed on the outside of curtain when in the stowed condition. Accordingly, the tether 82 may be kept very short so that the tether holds the lower edge 80a of the curtain 80 close to the side wall of the vehicle during and after deployment and throughout the deployment sequence without the need for the slit curtain and connecting member disclosed in the first embodiment of the invention.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. An occupant restraint system for an automotive vehicle having a roof and a pillar extending downwardly from the roof to define a lateral edge of
   an opening, the system comprising:
   an occupant restraint curtain having a first edge securable to the roof adjacent an upper edge of the opening and an opposite second edge, the curtain movable between a stowed condition wherein the curtain is retained adjacent the roof and a deployed condition wherein the curtain is generally planar and extends downwardly from the roof to cover at least a portion of the opening, the curtain comprising first and second sections separated by a slit extending from the second edge toward the first edge;
   a connecting member attached to the curtain adjacent the second edge thereof to span the slit and connect the first and second sections; and
   a tether having a first end engageable with the pillar for movement therealong when the curtain moves between the stowed and deployed conditions, the tether having a second end rotatably engaged with the connecting member whereby the connecting member is free to rotate relative to the tether as the curtain moves between the stowed condition and the deployed condition.

2. The occupant restraint system according to claim 1 wherein the first edge of the curtain is securable to a roof rail extending generally parallel to the upper edge of the opening.

3. The occupant restraint system according to claim 1 wherein the stowed condition is achieved by rolling the second edge toward the first edge.

4. The occupant restraint system according to claim 1 wherein the curtain is an airbag that is inflated when in the deployed condition.

5. The occupant restraint system according to claim 1 wherein the connecting member is rigid.

6. The occupant restraint system according to claim 1 further comprising a ring connected to the second end of the tether and encircling the connecting member.

7. The occupant restraint system according to claim 1 further comprising a guide track extending along the pillar for engagement with the second end of the tether.

8. The occupant restraint system according to claim 1 wherein the curtain has a second slit extending generally parallel to the first slit, and further comprising:
   a second connecting member attached to the curtain adjacent the second edge thereof to span the second slit; and
   a second tether having a first end engageable with the pillar for movement therealong when the curtain moves between the stowed and deployed conditions, the second tether having a second end rotatably engaged with the second connecting member whereby the second connecting member is free to rotate relative to the second tether as the curtain moves between the stowed condition and the deployed condition.

9. An occupant restraint curtain for use in an automotive vehicle having a roof defining an upper edge of an opening and a pillar extending downwardly from the roof to define a lateral edge of the opening, the curtain comprising:
   a first edge securable to the roof adjacent the upper edge of the opening;
   a second edge opposite the first edge, the curtain movable between a stowed condition wherein the curtain is compacted for storage adjacent the roof and a deployed condition wherein the curtain is generally planar to extend downwardly from the roof and cover at least a portion of the opening;
   first and second sections separated by a slit extending from the first edge toward the second edge;
   a connecting member attached to the curtain adjacent the second edge thereof to span the slit and connect the first and second sections; and
   a tether having a first end engageable with the pillar and a second end rotatably engaged with the connecting member whereby the connecting member is free to rotate with respect to the tether.

10. The occupant restraint curtain according to claim 9 wherein the stowed condition is achieved by rolling the second edge toward the first edge.

11. The occupant restraint curtain according to claim 9 wherein the opening is a door opening.

12. The occupant restraint curtain according to claim 9 wherein the curtain has a second slit extending generally parallel to the first slit, and further comprising:
   a second connecting member attached to the curtain adjacent the second edge thereof to span the second slit; and
   a second tether having a first end engageable with the pillar and a second end rotatably engaged with the second connecting member whereby the second connecting member is free to rotate relative to the second.

13. An automotive vehicle comprising:
   a roof defining an upper edge of an opening;
   a pillar extending downwardly from the roof to define a lateral edge of the opening;
   an occupant restraint curtain having a first edge mounted to the roof adjacent the upper edge of the opening and an opposite second edge, the curtain movable between a stowed condition wherein the curtain is retained adjacent the roof and a deployed condition wherein the curtain extends downwardly from the roof to cover at least a portion of the opening, the curtain comprising first and second sections separated by a slit extending from the second edge toward the first edge;
   a connecting member attached to the curtain adjacent the second edge thereof to span the slit and connect the first and second sections; and
   a tether having a first end engaged with the pillar for movement therealong and a second end rotatably engaged with the connecting member whereby the connecting member is free to rotate with respect to the tether as the curtain moves between the stowed and the deployed positions.

14. The automotive vehicle according to claim 13 wherein the first edge of the curtain is secured to a roof rail extending generally parallel to the upper edge of the opening.

15. The automotive vehicle according to claim 13 further comprising a guide track extending along the pillar for engagement with the second end of the tether.

16. The automotive vehicle according to claim 13 further comprising a ring connected to the second end of the tether and encircling the connecting member.

17. The automotive vehicle according to claim 13 wherein the curtain has a second slit extending generally parallel to the first slit, and further comprising:
   a second connecting member attached to the curtain adjacent the second edge thereof to span the second slit; and
   a second tether having a first end engaged with the pillar for movement therealong when the curtain moves between the stowed and deployed conditions, the second tether having a second end rotatably engaged with the second connecting member whereby the second connecting member is free to rotate relative to the second tether as the curtain moves between the stowed condition and the deployed condition.

18. A method of securing an occupant restraint curtain in an automotive vehicle having a roof defining an upper edge of an opening and a pillar extending downwardly from the roof to define a lateral edge of the opening, the method comprising the steps of:
   providing an occupant restraint curtain comprising first and second sections separated by a slit extending from a first edge of the curtain toward an opposite second edge of the curtain, and a connecting member attached to the curtain adjacent the first edge thereof to span the slit and connect the first and second sections;
   rolling the first edge of the curtain toward the second edge such that the connecting member remains accessible though the slit;
   securing the second edge of the curtain to the vehicle adjacent the top edge of the opening;
   attaching a first end of a tether to the pillar for movement therealong; and
   rotatably engaging a second end of the tether with the connecting member whereby the connecting member is free to rotate with respect to the tether as the curtain moves between the stowed and the deployed positions.

19. The method according to claim 18 wherein the step of attaching a first end of a tether to the pillar comprises engaging the first end of the tether with a guide track extending along the pillar.

20. A method of placing an occupant restraint curtain for an automotive vehicle in a stowed condition, the method comprising the steps of:
   securing a first end of a tether to a first edge of the curtain;
   folding the curtain generally in half to place the first edge adjacent an opposite second edge and form a crease edge opposite the tether;
   rolling the curtain in spiral fashion, starting at the crease edge and rolling toward the first and second edges, whereby the tether is exposed on an outside of the roll when in the stowed condition.

* * * * *